United States Patent [19]
Clelland

[11] Patent Number: 5,112,082
[45] Date of Patent: May 12, 1992

[54] LOW PROFILE VEHICLE CONSTRUCTION

[75] Inventor: William F. Clelland, Columbia, Mo.

[73] Assignee: Ryder Truck Rental, Inc., Miami, Fla.

[21] Appl. No.: 674,591

[22] Filed: Mar. 22, 1991

[51] Int. Cl.5 .............................................. B62D 21/00
[52] U.S. Cl. ..................................... 280/783; 296/182
[58] Field of Search .............. 280/781, 718, 783, 797,
280/800, 792, 795, 799, 788; 296/204, 182-183, 35.1

[56] References Cited

U.S. PATENT DOCUMENTS

| | | |
|---|---|---|
| 1,933,359 | 10/1933 | Archer . |
| 2,788,224 | 4/1957 | Ramun et al. ...................... 280/718 |
| 2,846,263 | 8/1958 | La Rue ................................ 296/182 |
| 3,042,423 | 7/1962 | Bock .................................. 280/797 |
| 3,287,058 | 11/1966 | Wells . |
| 3,713,662 | 1/1973 | Abromavage et al. ............. 280/800 |
| 4,198,187 | 4/1980 | Mountz ............................... 414/537 |
| 4,239,276 | 12/1980 | Bertolini . |
| 4,852,936 | 8/1989 | Greene et al. ...................... 296/204 |

FOREIGN PATENT DOCUMENTS

| | | |
|---|---|---|
| 0963397 | 7/1949 | Fed. Rep. of Germany ...... 280/788 |
| 2117940 | 10/1971 | Fed. Rep. of Germany ...... 280/795 |

*Primary Examiner*—Charles A. Marmor
*Assistant Examiner*—Paul Dickson
*Attorney, Agent, or Firm*—Laff, Whitesel, Conte & Saret

[57] ABSTRACT

A cargo vehicle includes a vehicle chassis and a body. The vehicle chassis has a pair of chassis frame rails to which the body is mounted. The body has a rear structural section and a front structural section. In the rear structural section, a pair of body longitudinal rails are mounted above the chassis rails. The body rails and the chassis rails are separated by a thin, vibration attenuating sheet of resilient material. A plurality of floor support members are mounted on and extend from the sides of the body and chassis rails, in contrast to prior art cargo vehicles which mounted the floor support members above the body rails. The thin, resilient separator material and the lowered floor support advantageously reduce the height of the cargo section floor. A ramp storage region is defined in the space within the body rails. In the front structural section, the ramp storage region is not required. A second pair of body longitudinal body rails is provided in the front section above the chassis rails. The front body rails have a reduced vertical dimension, permitting installation of floor support cross members on top of the body rails while providing a floor plank mounting height consistent with that of the rear structural section.

9 Claims, 3 Drawing Sheets

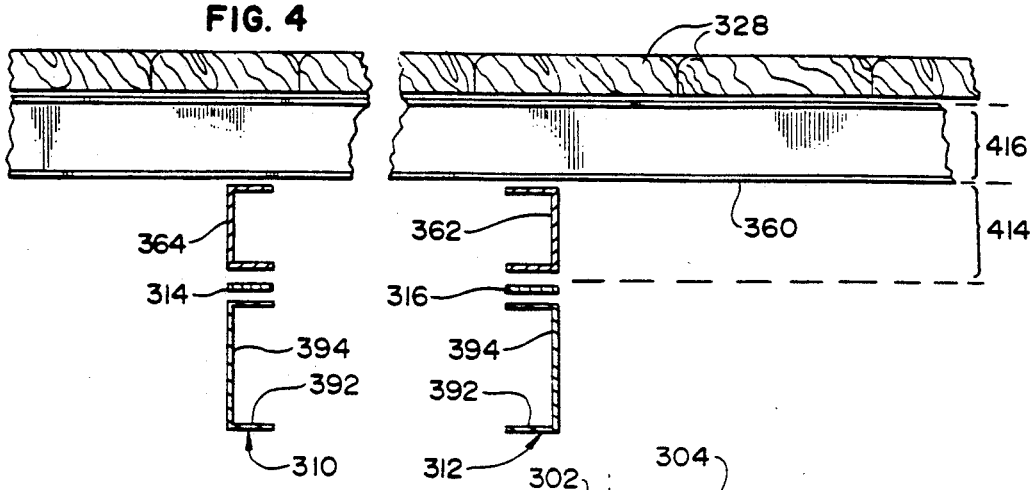
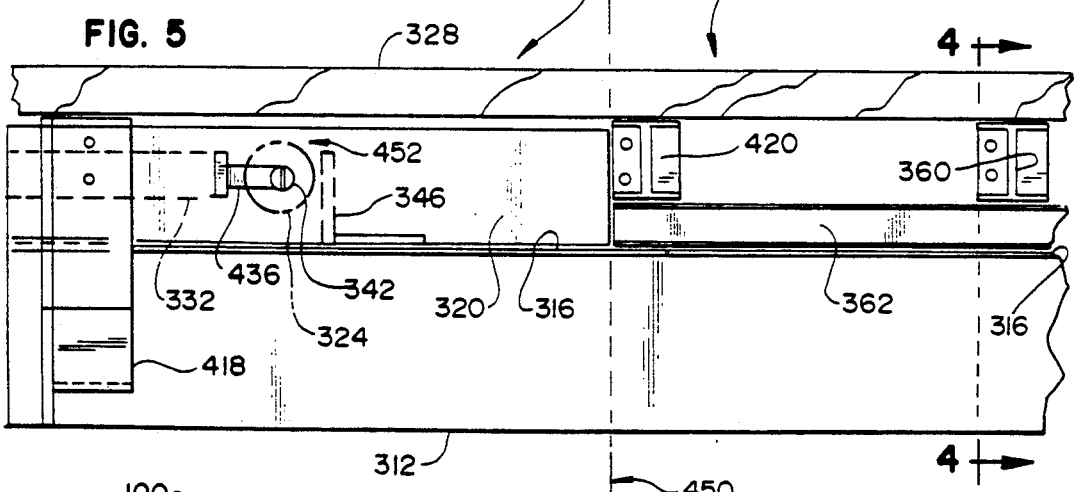
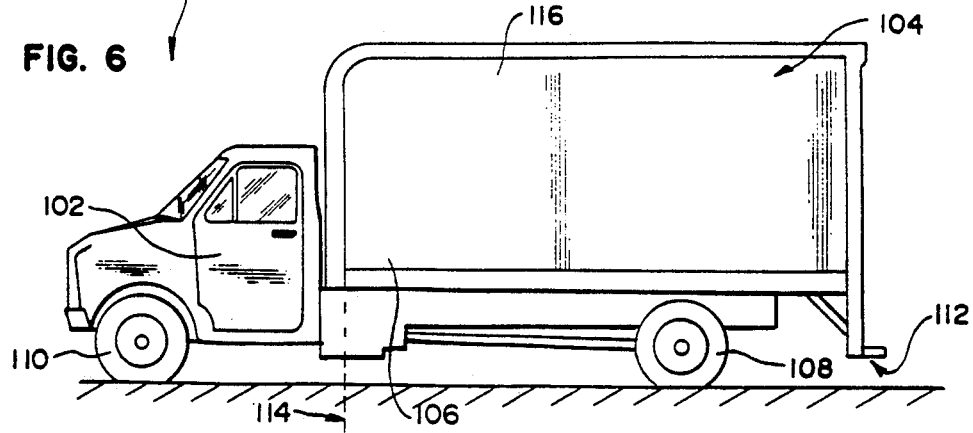

LOW PROFILE VEHICLE CONSTRUCTION

BACKGROUND OF THE INVENTION

This invention relates to the construction of motor vehicles, and more particularly to the construction of cargo vehicles having a low profile and including a self-storing ramp for loading and unloading.

Cargo vehicles, including conventional cab, chassis, and van combinations, are used for a variety of applications, including pick-up and delivery of commercial packages and transportation of household goods. In these and other applications, the vehicles are often loaded and unloaded at facilities which are not equipped with a traditional loading dock having a floor level even with the floor level of the cargo section of the vehicle. The vehicle loading and unloading locations also typically lack power-assisted loading equipment, such as lift trucks and the like. Hence, loading and unloading of such vehicles is often performed manually. It is therefore highly desirable to construct cargo vehicles having features which minimize the amount of human effort required to load the vehicle.

One way manufacturers of prior art cargo vehicles have addressed this problem is by providing a loading ramp to extend from the floor of the cargo area at the rear of the vehicle to the ground. Personnel may carry items up the ramp more easily than lifting the item from the ground to the cargo compartment. The ramp also permits loading via a wheeled hand-truck or similar loading aid.

For vehicles which are equipped with loading ramps, it is preferable that the vehicle provide a place where the ramp may be stored when not in use, such as when the vehicle is being driven from one location to another. The ramp storage space is preferably provided without reducing the space available for cargo storage.

Many cargo vehicles are constructed by assembling a van body onto a commercially available vehicle chassis. The chassis typically has a pair of structural members, referred to as chassis frame rails, which are arranged in spaced parallel relation to each other and extend longitudinally from a position near the front of the vehicle to the rear of the cargo section of the van. The rails each have flanges at their top and bottom ends. The flanges on each rail extend inward toward the opposite rail, giving the cross-section of the chassis frame rails a squared-off "C"-shaped appearance. The vehicle body is mounted on the vehicle chassis. A body longitudinal rail, similar to the chassis frame rails, is mounted atop each of the chassis frame rails to support the cargo section floor. The chassis frame rails and body longitudinal rails are separated by wooden "breaker" strips having a thickness of several inches which reduce the propagation of shock and vibration from the chassis rails to the body rails. A large number of "cross sill" structural members are mounted on top of and perpendicular to the body longitudinal rails. The cargo section floor, composed of a large number of wooden boards, are secured on top of the cross sills.

Some manufacturers of such prior-art cargo vehicles have found the space between the chassis frame rails to be an ideal location for storing the loading ramp. The ram width is selected so that it is narrow enough that the ramp fits between the chassis frame rails but wide enough that the ramp remains captured by the inward-extending rail flanges.

Another way to minimize the human effort in loading and unloading a vehicle is to reduce the height of the floor of the cargo section. The energy required to raise an object is proportional to the distance it is to be raised. Commercial vehicle chassis manufacturers have developed "low-profile" designs in which the height above ground of the chassis frame rails is reduced. Since the chassis frame rails support the cargo section of the vehicle, for a given body design, lowering the chassis frame rails advantageously lowers the height of the cargo section floor. Use of a low-profile chassis also makes the vehicle easier to drive, especially for inexperienced drivers.

For some vehicles, however, lowering the chassis frame rails precludes storage of the ramp between the rails, because the clearance between the rails and the vehicle drive train is also reduced. As a result, during some driving conditions, drive train components, such as the differential housing, may intrude into the space between the chassis frame rails. For longer vehicles, the differential is positioned far forward, such that the ramp in its storage position does not extend into the region into which the differential intrudes. For shorter vehicles, however, the ramp may extend forward beyond the differential, so that when driving on an uneven surface, the differential may collide with the ramp. Using a substantially shorter ramp is not an effective solution to the problem, because the greater inclined slope produced by the shorter ramp is unacceptable to users. For most applications, ramp lengths shorter than about ten feet are not desirable.

In addition to the ramp storage problems, the use of existing van bodies with the commercially available low-profile vehicle chassis does not provide as great a reduction in the cargo section floor height as is desirable by vehicle users and fleet operators.

OBJECTS AND SUMMARY OF THE INVENTION

It is therefore an object of the present invention to provide a cargo vehicle having a lowered cargo section floor and including a self-storing loading ramp.

It is another object of the invention to provide a cargo vehicle body which is suitable for use with a low-profile vehicle chassis and which provides a storage area for a loading ramp.

A cargo vehicle according to the present invention comprises a vehicle chassis and a van body. The vehicle chassis has a pair of chassis frame rails to which the van body is mounted. The van body has a rear structural section and a front structural section. In the rear structural section, a pair of body longitudinal rails are mounted above the chassis rails. The body rails and the chassis rails are separated by a thin, vibration attenuating sheet of resilient material. A plurality of floor support members are mounted on and extend from the sides of the body and chassis rails, in contrast to prior art vehicles which mounted the floor support members above the body rails. The thin, resilient separator material and the lowered floor support advantageously reduce the height of the cargo section floor. A ramp storage region is defined in the space within the body rails. In the front structural section, the ramp storage region is not required. A second pair of body longitudinal body rails is provided above the chassis rails. The front body rails are substantially shorter than the rear body rails, permitting installation of floor support cross members on top of the body rails while providing a floor plank mounting height consistent with that of the rear structural section.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 4 is a cross section view of the structural components of FIG. 2 within a second region thereof, taken along the view lines 4—4 of FIG. 2;

FIG. 5 is a side elevation view of a portion of the structural components of FIG. 2, taken along the view lines 5—5 of FIG. 2; and FIG. 6 is a side elevation view of a typical vehicle in which the invention may be used.

DETAILED DESCRIPTION OF THE PREFERRED EMBODIMENT

Figure 1:
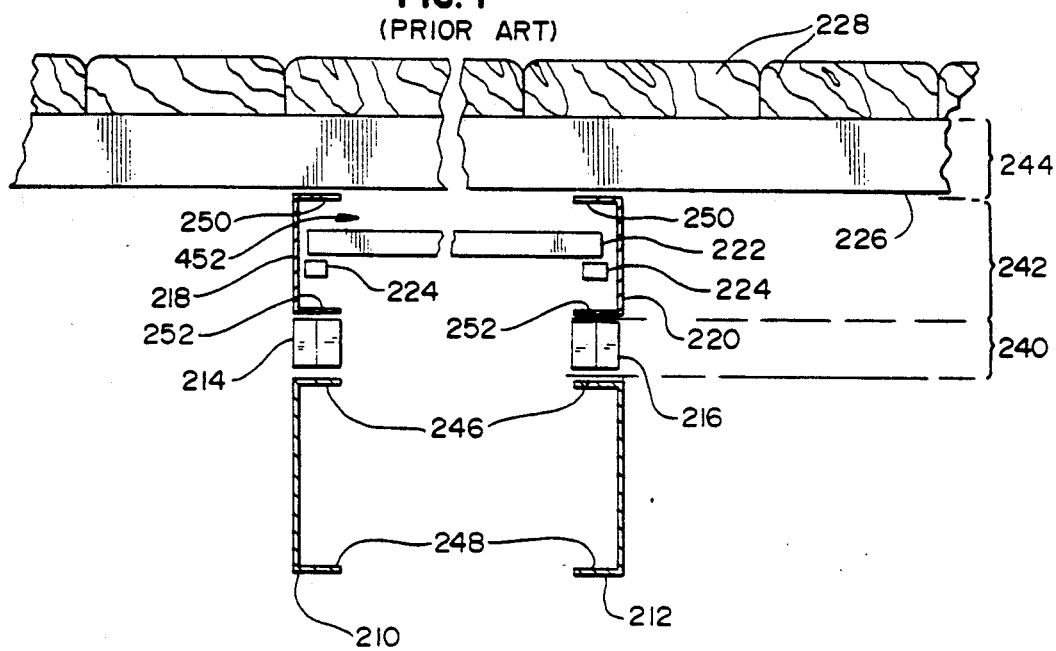
FIG. 1 is a rear elevation view of a section of a prior art cargo vehicle including structural components for supporting the van body.

A cargo vehicle 100 is depicted in FIG. 6 in order to show an example of the type of vehicle to which the present invention may be applied. The vehicle 100 has a cab section for housing a driver and passengers, and a cargo section 104 for housing cargo. The vehicle has a set of front wheels 110 and a set of rear wheels 108. The front of the cargo section, i.e. the boundary between the cab section and the cargo section, is designated by reference numeral 114. The rear of the cargo section is designated by reference numeral 112. The cargo section floor 106, which is normally obscured by the walls 116 of the cargo section 104, is shown in FIG. 6 for clarity. The features of the cargo vehicle 100 shown in FIG. 6 are generic to both prior art vehicles and vehicles constructed according to the present invention.

The vehicle 100 and other vehicles of the type to which the present invention may be applied are typically constructed by assembling a vehicle body onto a commercially available vehicle chassis. However, the invention could also be used with many other types of vehicles, including those constructed in an integrated process by a single manufacturer.

A portion of the structural system of a prior art cargo vehicle is depicted in FIG. 1. The van body is mounted on the vehicle chassis. The chassis has a pair of structural members, referred to as left and right chassis frame rails 210, 212, which are arranged in spaced parallel relation to each other and extend longitudinally from a position near the front of the vehicle to the rear terminus 112 (FIG. 6) of the cargo section of the vehicle. The rails 210, 212 each have an upper flange 246 and a lower flange 248. The flanges 246, 248 on each rail extend inward toward the opposite rail, giving the chassis frame rails 210, 212 a squared-off "C"-shaped appearance.

Left and right body longitudinal rails 218, 220, are mounted above left and right chassis frame rails 210, 212 respectively, to support the cargo section floor. The body longitudinal rails 218, 220 are essentially similar to the chassis frame rails 210, 212 but may be constructed having a shorter vertical section. The body longitudinal rails 218, 220 each have an upper flange 250 and a lower flange 252. The chassis frame rails 210, 212 and body longitudinal rails 218, 220 are separated by wooden "breaker" strips 214, 216 having a thickness of several inches. The "breaker" strips 214, 216 reduce the propagation of shock and vibration from the chassis rails to the body rails. A large number of "cross sill" structural members, of which member 226 is typical, are mounted on top of and perpendicular to the body longitudinal rails 218, 220. Several wooden boards 228, are secured on top of and perpendicular to the cross sills 226 to form the floor of the cargo section.

The space between the body longitudinal rails 218, 220 provides storage for a loading ramp 222. When in the storage region, the ramp 222 rests on the lower flanges 252 of the body longitudinal rails 218, 220. The loading ramp 222 has a set of rollers 224 to permit the ramp to slide along flanges 252 for easy removal by the user.

In the prior art vehicle of FIG. 1, the height of the cargo section floor above the ground (or other surface on which the vehicle rests) is primarily determined by the height of the chassis frame rails 210, 212, and the thicknesses of the breaker strips 214, 216, body longitudinal rails 218, 220, and cross sills 226. For a cargo vehicle constructed from a commercially available vehicle chassis, the height of the chassis frame rails 210, 212 is largely controlled by the chassis manufacturer.

In commercial embodiments of the prior art vehicle, the thickness of the breaker strips 214, 216, shown as dimension 240, is typically approximately three inches. The thickness of the body longitudinal rails 218, 220, shown as dimension 242, is approximately five inches. The thickness of the cross sills 226, shown as dimension 244, is approximately three inches. Thus, in vehicles constructed according to the prior art design, the base of the cargo section floor is about eleven inches above the top of the chassis frame rails 210, 212. The top of the chassis frame rails varies according to the chassis design, but for a "standard" commercially-available vehicle chassis, this height is approximately 36 inches, and for "low-profile" chassis, this height is about 30 inches.

Although the use of a low-profile vehicle chassis alone allows a reduction of the cargo section floor height by about six inches, it is desirable to provide a further reduction in floor height. FIGS. 2-5 show a preferred embodiment of the structural system 300 of a cargo vehicle constructed according to the present invention which provides a further substantial reduction in the height of the cargo section floor while providing suitable convenient storage for a loading ramp.

The structural system 300 comprises components of the vehicle chassis and components of the vehicle body. Because various configurations of vehicle chassis are well known, and because chassis frame rails 310, 312 are the most important chassis components with respect to attaching the vehicle body to the vehicle chassis, only the chassis frame rails are shown in the figures.

Figure 3:
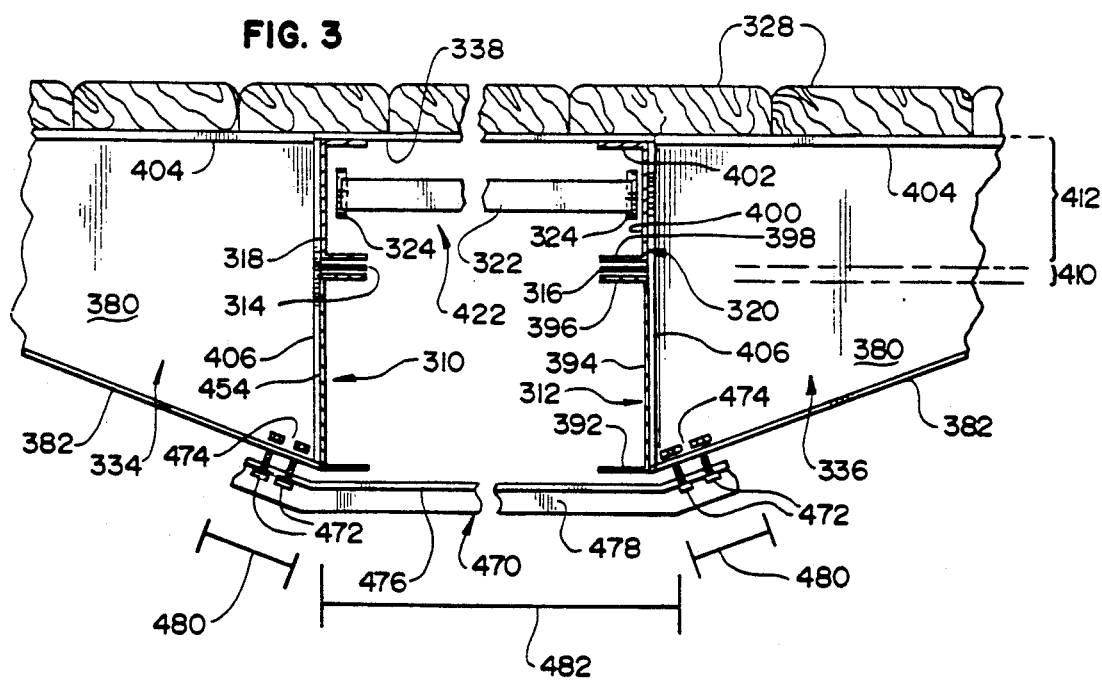
FIG. 3 is a cross section view of the structural components of FIG. 2 within in a first region thereof, taken along the view lines 3—3 of FIG. 2.
Figure 2:
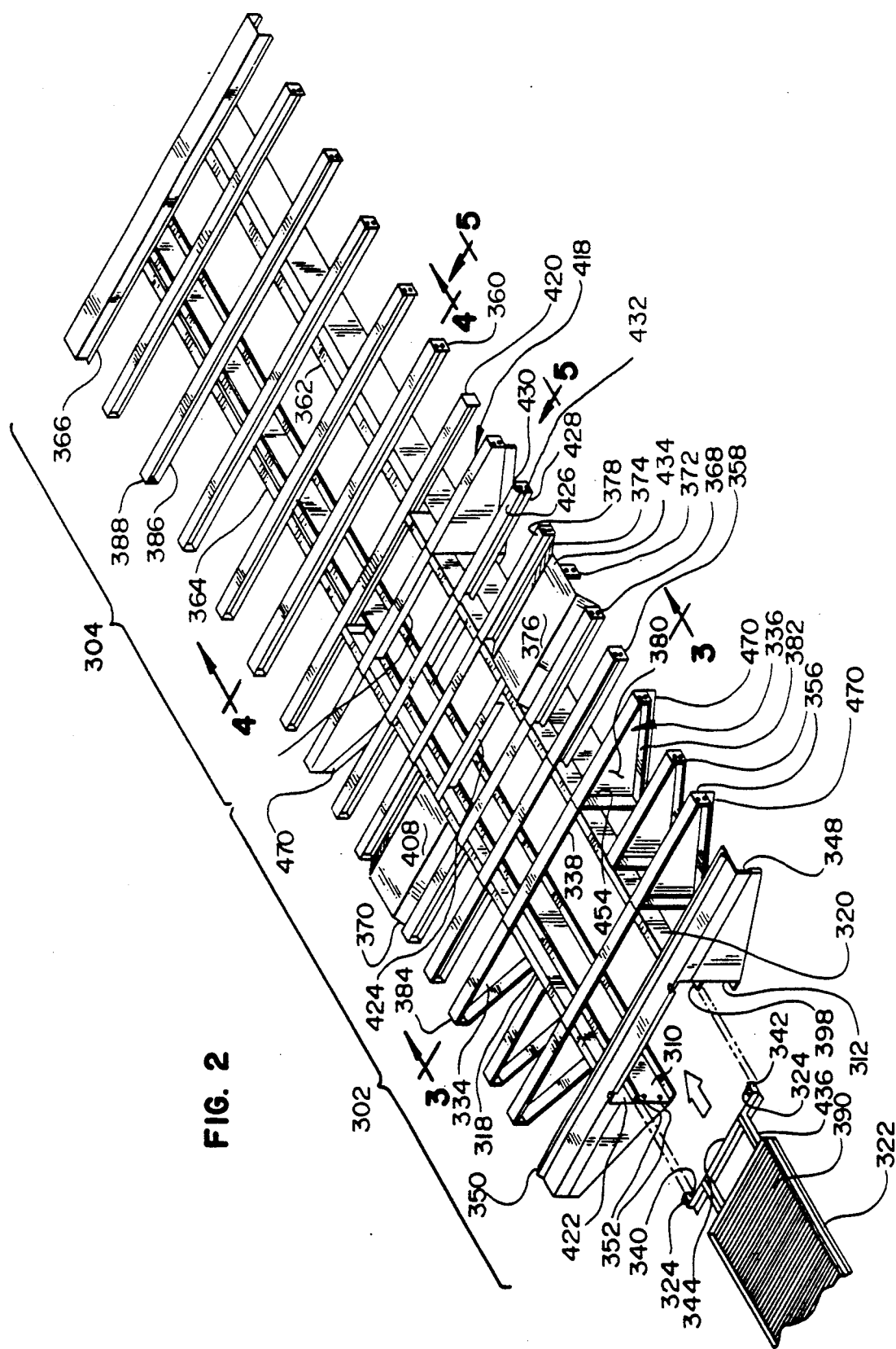
FIG. 2 is an overall perspective view of the structural components for supporting the van body of a low-profile cargo vehicle according to the present invention.

As best seen in FIGS. 2 and 5, the structural components of the vehicle body may be divided into a rear section 302 and a front section 304. The rear section 302 provides structural support for the cargo section floor using a construction arrangement which creates an appropriate region 422 for storage of a loading ramp 322. The front section 304 comprises the portion of the structural system 300 between the end 450 of loading ramp storage area 452 and the front end 114 of the cargo section 104, and therefore the front section 304 may use a simpler construction arrangement which does not provide a ramp storage region. FIG. 3 is a cross-section view through a typical position within the rear section 302. FIG. 4 is a cross-section view through a typical position within the front section 304. FIG. 5 is a side elevation view showing the boundary area between the rear and front sections 302, 304 in greater detail.

As most clearly seen in FIG. 2, the structural system 300 includes left and right chassis frame rails 310, 312 which extend in spaced parallel relation for at least the entire length of the cargo section 104 (FIG. 6). The chassis frame rails 310, 312 may also extend into the cab section 102 of the vehicle. The chassis frame rails 310, 312 are preferably supported by an appropriate conventional suspension system (not shown). As best seen in FIG. 2, each of rails 310, 312 has vertical section 394 and lower and upper flanges 392, 396 which extend inward toward the other rail. Thus, the rails 310, 312 have the general shape of a squared-off "C". The rear section 302 includes right and left body longitudinal rails 318, 320 which are mounted above the chassis frame rails 310, 312 respectively. The body longitudinal rails 318, 320 are similar to the chassis frame rails 310, 312 and each has a vertical section 400, a lower horizontal flange 398, and an upper horizontal flange 402.

The body longitudinal rails 318, 320 are separated from chassis frame rails 310, 312 by left and right resilient strips 314, 316 (FIG. 3) respectively. The strips 314, 316 reduce the propagation of shock and vibration from the chassis rails to the body longitudinal rails. Thus, the strips 314, 316 function similar to the breaker strips 214, 216 of the prior art vehicle. However, in order to reduce the vertical thickness of the structural system 300, strips 314, 316 are preferably constructed of an appropriate thin, reinforced, resilient material. A suitable material for strips 314, 316 is a strip of fiber-reinforced masticated rubber (sometimes referred to as "bridge-pack") having a width of approximately three inches and a thickness of approximately ⅛ inch. Such material is commercially available under the name "TENSILE-TEX SHEET" masticated rubber, Compound 4000, from All-State Belting Company, 1824 Industrial Circle, West Des Moines, IA, 50265.

The thickness of breaker strips 314, 316 is designated by reference numeral 410 (FIG. 3). In contrast to the three-inch wood breaker strips 214, 216 of the prior art vehicle, this material provides the desired vibration attenuation but is only about ⅛ inch thick. Thus, in the rear section 302 of the structural system, the use of strips 314, 316 permits a reduction of approximately 2 ⅞ inches in the height of the cargo section floor.

The body longitudinal rails 318, 320 form a storage region 422 between them for a loading ramp 322. When in the storage position, the ramp 322 rests on lower flanges 398 of the longitudinal rails. The ramp 322 preferably has a set of rollers 324 to permit the user to easily slide the ramp along the flanges 398 during storage and removal. The ramp has a substantially planar walking surface 390 which may have appropriate striations or other surface features to provide a non-slip surface. As best seen in FIG. 2, the rollers 324 are mounted for rotation on suitable bearings 340, 342. The rollers 324 and bearings 340, 342 are located on a mounting plate 344 which is attached to the front end of the ramp by a pair of extension brackets 436. The ramp storage region 422 is far enough above any components of the vehicle drive train to prevent such components from entering the region 422 to interfere with the ramp 322. A stop member 346 (FIGS. 2, 5) within the ramp storage region prevents the ramp from traveling too far forward. One or more anti-rattle plates 424 preferably extend into the ramp storage region to prevent the ramp 322 from bouncing excessively during vehicle operation.

The cargo section floor is preferably constructed of a plurality of planks or sheets 328 (FIGS. 3, 4) made from an appropriate sturdy material such as wood. The floor planks 328 are preferably arranged lengthwise—i.e. parallel to the body longitudinal rails 318, 320. Front and rear sills 366, 348 (FIG. 2) are provided to retain the floor planks 328 and promote a pleasing appearance. A small incline 350 on rear sill 348 forms a ramp surface to facilitate the use of wheeled hand trucks and the like by eliminating the "step" which the floor would otherwise create.

The rear section 302 of the structural system has a network of structural members to support the cargo section floor planks 328 and the cargo section walls. These structural members are similar in function to the cross-sill members 226 of the prior-art cargo vehicle. However, in order to reduce the effective height of these floor support members, as compared to the prior art vehicle, the floor support members are specially constructed and mounted to avoid extending a substantial distance above the body longitudinal rails 318, 320.

In contrast to the cross-sills 226 of the prior art vehicle, which were simply mounted on top of the body longitudinal rails 218, 220, the new floor supports of the rear section 302 are securely mounted on the sides of the body longitudinal rails 318, 320. This permits them to support the floor (and walls) of the cargo section, while minimizing their contribution to the vertical thickness of the structural system 300.

As best seen in FIG. 2, in order to accommodate certain features of the cargo vehicle, four different types of support members are provided. Several "outrigger" type supports 356 are conventionally attached to and extend outward from body longitudinal rails 318, 320. Simple I-Beam-type supports 358 are also conventionally attached to and extend outward from body longitudinal rails 318, 320. The I-Beam supports 358 are used in locations where there is insufficient room for the outrigger supports 356, e.g. in the areas adjacent the wheel housings. A pair of modified plate-like supports 376, 408 are provided to support the floor above the wheel housings, because the housings extend so far upward that there is insufficient room for the I-Beam type supports. Cross plates 338 are provided to span the distance between the body longitudinal rails 318, 320.

As seen most clearly in FIGS. 2-3, typical left and right outrigger supports 334, 336 each have a trapezoidal plate portion 380 disposed perpendicularly to the long axis of the body longitudinal rails 318, 320. The inner edge 454 of the trapezoidal plate extends downward from the top of the body longitudinal rails 318, 320 to the bottom of the chassis frame rails 310, 312. Because at least a portion of the load on the outrigger supports is applied at a substantial distance from the mounting location, the supports are subject to large moment forces. The longer inner edge 454 bears against both the chassis rails and the body rails, thereby providing substantially greater load capability compared to the supports lacking the trapezoidal plate.

The outrigger supports 334, 336 also have a set of flanges which extend perpendicularly from the plate portion 380 to provide greater resistance to longitudinally-applied loads. The supports 334, 336 have an upper flange 404 to provide a surface for supporting floor planks 328. An inner-edge flange 406 provides a surface for attaching the support to the body longitudinal rails 318, 320. A lower-edge flange 382 provides additional strength. An outside-edge flange 356 provides a surface for attaching the supports to the walls of the cargo section.

As seen most clearly in FIGS. 2 and 3, for each of several of the outrigger-type supports 356 (FIG. 2), 380, 382 (FIG. 3), a compression angle 470 is provided to span the gap formed by the bottom of the supports 356, 380, 382 and by the chassis frame rails 310, 312. The compression angles 470 help prevent loads which are applied to the outrigger-type supports from deforming or displacing the chassis frame rails. Each compression angle 470 is constructed having a flange and attachment member 476 and a substantially planar vertical member 478 extending perpendicularly to the flange member 476. As best seen in FIG. 3, the flange member 476 of the compression angle 470 is bent upward to follow the contour of the lower-edge flange 382 of the outrigger-type support 380, 382, and is attached to the lower-edge flange 382 using appropriate conventional fasteners 472, 474. The vertical member 478 has a contour compatible with that of the flange member 476. In that portion 482 of the compression angle 470 which bridges the gap between the chassis rails 310, 312, the flange member 476 extends substantially horizontally. The portions 480 of compression angle 470 adjacent the bottom of the outrigger supports may extend along the entire length of the outrigger supports or may be substantially truncated depending on whether it is desired to provide additional structural rigidity to the supports.

As seen most clearly in FIGS. 2 and 3, the cross plate supports 338 span the distance between the body longitudinal rails 318 and 320. Supports 338 are preferably conventionally secured to the upper flanges 402 of rails 318, 320. Cross supports 338 are required to support only the floor planks 328, and not the cargo section walls. In addition, in contrast to the outrigger and I-beam type supports, which are cantilevered and thus subject to large moment forces, the cross supports 338 are secured at each end and loaded in tension. Therefore, the cross supports 338 may be constructed of a relatively thin material. The cross supports 338 thus advantageously contribute only a small amount to the height of the structural system 300.

The I-beam supports 358 are preferably conventionally attached to the body longitudinal rails 318, 320. The I-beam supports 358 have a vertical rail section 432 disposed perpendicularly to the long axis of the body longitudinal rails 318, 320. Upper and lower flanges 426, 428 extend perpendicularly from the rail section 432 to provide greater strength.

Right and left modified plate-like supports 376, 408 are provided to support the floor above the wheel housings (not shown). The housings extend upward sufficiently far that they would interfere with even the relatively-thin I-beam type supports. The supports 376, 408 each comprise a formed plate suspended between two I-beam suspension supports 368, 378. Each plate has a raised central flat region 434 from which depends a pair of sloped regions 370, 374. The sloped regions 370, 374 provide a level transition between the bottom flanges of I-beam supports 368, 378, and the level of the raised central flat region 434, which is preferably equal in height to the top flanges of the neighboring I-beam and outrigger supports. A flange 372 is provided on the flat region 434 of each support for attachment to the cargo section walls.

The front section 304 of the structural system 300 is most clearly seen in FIGS. 2, 4, and 5. Right and left front section body longitudinal rails 362, 364 are mounted above the chassis frame rails 310, 312. The front section body longitudinal rails 362, 364 provide a mounting surface for full-length I-beam supports 386. The I-beam supports 420, 360, 386 are similar in construction to the cross sills 226 used in the prior art cargo vehicle of FIG. 1. The front section body longitudinal rails 362, 364 have vertical dimensions selected so that the I-beam supports 386 installed thereon are equal in level to the various supports of the rear structural section 302. This provides for floor planks 328 a mounting surface having a consistent height throughout the cargo section.

As best seen in FIG. 3, in the rear structural section, the height of the cargo section floor above the ground is primarily determined by the height of the chassis frame rails 310, 312, and the thicknesses of the breaker strips 314, 316, and the body longitudinal rails 318, 320. The thickness of the breaker strips 314, 316, shown as dimension 410, is approximately ⅛ inch. The thickness of the body longitudinal rails 318, 320, shown as dimension 412, is approximately five inches. Because the floor and wall support members are mounted on the sides of body longitudinal rails 318, 320, the thickness of the floor and wall support members does not contribute to the height of the floor.

As best seen in FIG. 4, in the front structural section 304, the height of the cargo section floor above the ground is primarily determined by the height of the chassis frame rails 310, 312, the thicknesses of the breaker strips 314, 316, the height of the body longitudinal rails 362, 364 and the thickness of the I-beam supports such as support 360. The thickness of the breaker strips 314, 316, is approximately ⅛ inch. The thickness of the I-beam support 360 shown as distance 416, is approximately three inches. The height of the longitudinal rails 362, 364 shown as distance 414, is approximately 2 3/16 inches.

Thus, in a vehicle constructed according to the present invention, the base of the cargo section floor is about 5¼ to 5 5/16 inches above the top of the chassis frame rails 310, 312. For any particular chassis design, the present invention advantageously provides a reduction of nearly six inches in the floor height compared to a prior art vehicle body mounted on the same chassis. When used in combination with a "low-profile" vehicle chassis, a vehicle body constructed according to the present invention achieves a total reduction of about eleven inches compared to prior art vehicle bodies mounted on a "standard" chassis.

The above-described embodiment of the invention is merely one example of a way in which the invention may be carried out. Other ways may also be possible, and are within the scope of the following claims defining the invention.

What is claimed is:

1. A low profile cargo vehicle having a cab and a cargo storage area with walls, a floor, and a ramp, comprising:

a pair of spaced longitudinally-extending chassis frame rails having front and rear sections;

a first spaced pair of longitudinally-extending body rails superposed over said front section of said chassis frame rails;

a second spaced pair of longitudinally extending body rails superposed over said rear section of said chassis frame rails, said second body rails providing a ramp storage region between them, said chassis frame rails and said first and second body rails each having a vertical surface facing exteriorly, the combined height of the vertical surfaces of said first body rails and said chassis frame rails in said front section being less than the combined height of the vertical surfaces of said second body rails and said chassis frame rails in said rear section;

at least one pair of outrigger supports mounted opposite each other and bearing against said vertical surfaces of said second body rails and said chassis frame rails, said outrigger supports each having an upper flange;

a plurality of cross supports mounted transversely to said second body rails, said cross supports each having an upper surface substantially coplanar with said upper flanges of said outrigger supports; and a plurality of beam supports mounted transversely to said first body rails, said beam supports each having an upper surface and a vertical dimension such that said upper surfaces of said beam supports and cross supports and said upper flanges of said outrigger supports provide a substantially planar supporting surface for said cargo area floor.

2. The low profile cargo vehicle of claim 1 including resilient breaker strips between said second body rails and said chassis frame rails.

3. The low profile cargo vehicle of claim 1 wherein said outrigger supports include an inner edge parallel to and substantially equal in height to the combined height of said second body rail, breaker strip, and chassis frame rail.

4. The low profile cargo vehicle of claim 1 wherein said outrigger supports are secured to said vertical surfaces of said second body rails.

5. The low profile cargo vehicle of claim 1 including two pairs of beam supports mounted opposite each other and exteriorly of said second body rails, and a pair of plate supports, each plate support suspended between an adjacent pair of beam supports, said plate supports each having an upper surface superposed over a vehicle wheel and substantially coplanar with said upper surfaces of said cross supports and beam supports and said upper flanges of said outrigger supports.

6. The low profile cargo vehicle of claim 1 wherein said outrigger supports are affixed to said walls of said cargo storage area.

7. The low profile cargo vehicle of claim 1 and a compression angle associated with each pair of outrigger supports, said compression angle affixed to opposite outrigger supports below said chassis frame rails.

8. The low profile cargo vehicle of claim 1 wherein said cross supports are loaded in tension between said second body rails.

9. A support structure for the cargo storage area of a vehicle, said storage area having a low profile floor, comprising:

front and rear sections of said support structure;

a spaced pair of longitudinally-extending chassis frame rails extending through said front and rear sections;

a first spaced pair of longitudinally-extending body rails mounted above and parallel to said chassis frame rails in said front section;

a second spaced pair of longitudinally-extending body rails mounted above and parallel to said chassis frame rails in said rear section, said chassis frame rails and said first and second body rails each having at least one substantially vertical surface facing exteriorly, the height of said vertical surfaces of said first body rails being shorter than the height of said vertical surfaces of said second body rails;

at least one pair of outrigger supports in said rear section of said support structure, each of said outrigger supports bearing against said vertical surfaces of both said chassis frame rails and said second body rails, said outrigger supports each having an upper flange extending transversely to said second body rails and an inner edge extending parallel to and substantially the entire height of said vertical surfaces of both one of said chassis frame rails and one of said second body rails;

a cross plate associated with each pair of outrigger supports and mounted transversely across said second body rails, said cross plate having an upper surface substantially coplanar with said upper flanges of said outrigger supports and secured thereto;

at least one beam support in said front section mounted transversely across said first body rails, said beam support having an upper surface and a vertical dimension such that said upper surface is substantially coplanar with said upper flanges of said outrigger supports and with said upper surface of said cross plate;

whereby said outrigger supports, cross plate and beam support provide a substantially planar supporting surface for said cargo storage area floor over and without intrusion from the wheels of the vehicle.

* * * * *

UNITED STATES PATENT AND TRADEMARK OFFICE
CERTIFICATE OF CORRECTION

PATENT NO. : 5,112,082
DATED : May 12, 1992
INVENTOR(S) : William F. Clelland

It is certified that error appears in the above—identified patent and that said Letters Patent is hereby corrected as shown below:

Column 1, line 65     "ram" should be --ramp--

Column 9, line 40     "1" should be --2--

Signed and Sealed this

Twelfth Day of October, 1993

Attest:

Attesting Officer

BRUCE LEHMAN

Commissioner of Patents and Trademarks